United States Patent Office 2,871,107
Patented Jan. 27, 1959

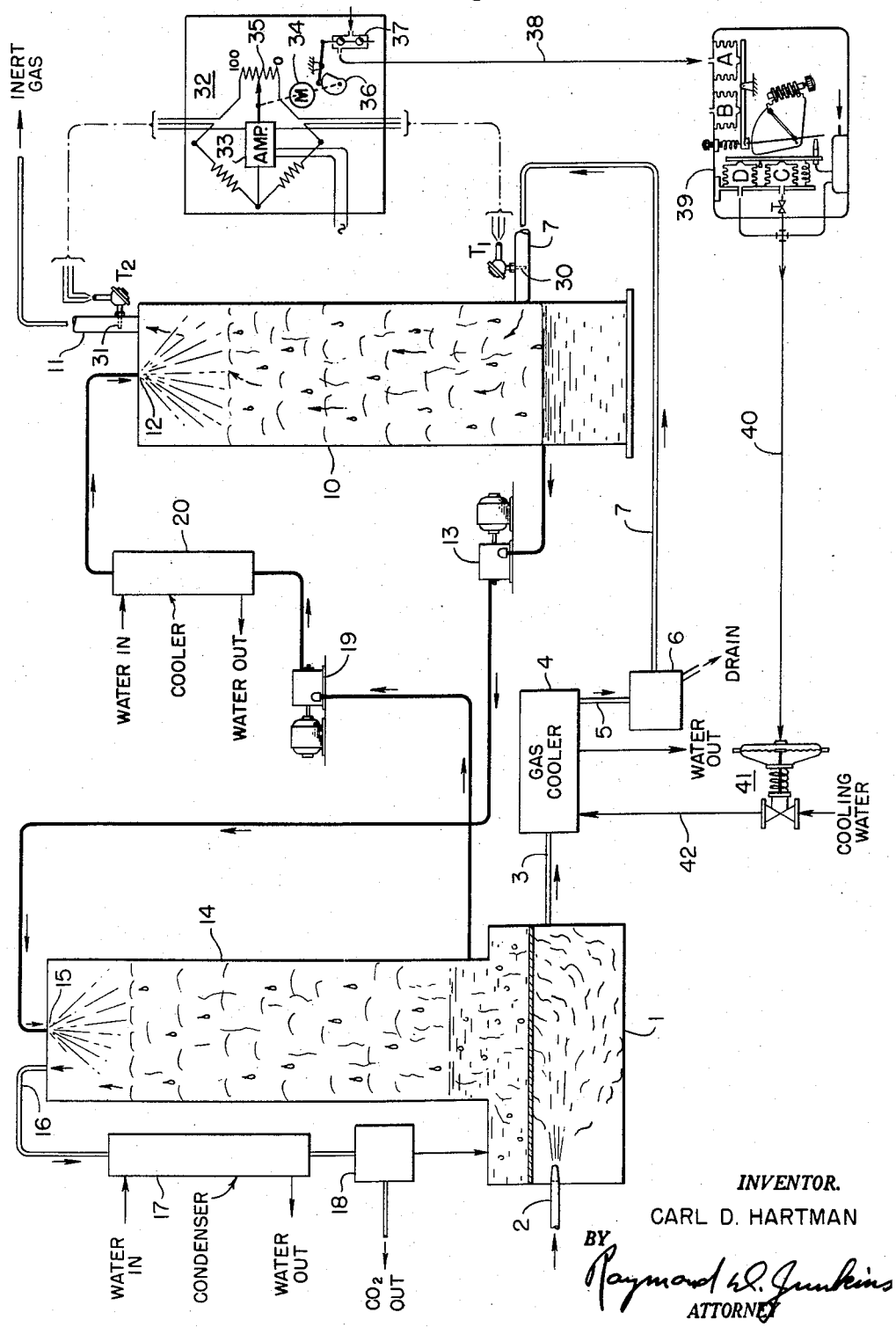

2,871,107
MOISTURE CONTROL IN GAS GENERATORS

Carl D. Hartman, Pittsburgh, Pa., assignor to Bailey Meter Company, a corporation of Delaware Application August 3, 1955, Serial No. 526,201

5 Claims. (Cl. 23—281)

The present invention generally relates to the control of the moisture content of fluid mixtures. More specifically, the invention is directed to the control of the moisture which may be exchanged between a processing liquid and a processed mixture of gases.

The disclosure has been selected to specifically illustrate the invention as applied to the process of manufacturing atmospheres of predetermined compositions. The disclosure illustrates part of a system required for the production of high nitrogen, $CO_2$-free atmosphere. This product is useful wherever a neutral atmosphere is required. Employment of this atmosphere product enables the accomplishment of bright annealing without carburization or decarburization of alloy and high carbon steels. Further, all grades of carbon and alloy steels may be hardened without oxidation, carburization or decarburization in this atmosphere and many chemical and food processes can be carried out to advantage within this product.

The disclosed structure specifically contemplates the combustion of a gas composition in a chamber. The resulting products of combustion contain at least nitrogen, $CO_2$ and water. Generally, the products are immediately cooled to a certain extent to accomplish some separation of water. The products, under processing, are then taken to what is termed an absorbing tower where monoethanolamine is used to contact the products and absorb the $CO_2$ therefrom. At this point the present invention is applied to the control of the temperature of the products being processed in the $CO_2$ removal portion of the system. More specifically, adjustment of the temperature of the processed products, as they enter the removal system, is made to maintain a predetermined differential going into, and coming from, the removal system. It is generally appreciated that the products are saturated with water vapor as they are taken into the removal system and saturated as they leave the system. In order to prevent the deposition of moisture, along with $CO_2$, in the absorbing medium, thus diluting it, the processed products must have their temperature raised in the removal system in order to retain the total quantity of moisture with which they entered the system.

A primary object of the invention then becomes the control of the total moisture content of products of combustion being processed.

Another object of the invention is to control the exchange of moisture between processed fluids and processing liquids.

Another object of the invention is to control the total moisture content of a processed gas by regulation of the gas temperature.

Another object of the invention is to maintain a predetermined differential temperature of gas through a processing system to regulate the total moisture content of the gas.

Still another object of the invention is to apply the temperature differentials of a processed gas entering and leaving a process to the regulation of the gas temperature entering the process.

In the drawing the figure represents part of a complete system for the production and process of the gas in order to regulate its composition.

In the drawing, attention is initially drawn to combustion chamber 1 in which a combustible is united with oxygen by means of burner 2. The apparatus necessary to obtain the uniform mixture burned at burner 2 is not illustrated. This apparatus is understood to include a gas mixing pump, drawing air through a filter, this air flow automatically regulating the flow of the mixture to give a predetermined air-fuel ratio.

The air and fuel flow through visual flow meters, separately, to indicate the air-fuel ratio. They are then mixed together at a point preceding the pump inlet. The pump moves the air-fuel mixture through a piping system and automatic fire-check to the catalyst-filled combustion chamber in which the products of combustion are produced. Although this preparing structure for the burned mixture includes automatic ratio control, mixing pump and burner of specific characteristics, it is not deemed necessary to illustrate them. It is believed merely necessary to appreciate that products of combustion are produced in chamber 1, having a desired nitrogen content, a $CO_2$ constituent and water vapor.

The products of combustion to be processed, formed in chamber 1, are then taken, by conduit 3, to a heat exchanger 4 to receive a controlled reduction in temperature. Conduit 5 takes the processed products to a vapor separator 6 for mechanical removal of condensed moisture. Then conduit 7 transports the gaseous products of combustion to the $CO_2$ removal system.

In the art of producing these atmospheres, the $CO_2$ removal system is familiar as a continuous regenerative type that continuously reactivates and reuses the scrubbing chemical, or absorbing medium. The active agent of this chemical medium is monoethanolamine, specifically selected for its ability to absorb $CO_2$ from gases with which it comes in contact. In a subsequent part of its circuit, the $CO_2$ is released by heating the chemical compound to a sufficiently high temperature. This mixture is effective, when mixed with a predetermined proportion of water, and is familiar in these regenerative systems.

Attention is now focused on absorption tower 10. This structure is familiar in the art as consisting of a vertical cylindrical steel shell. It is filled with packing rings, down over which the absorbing medium, or scrubbing chemical liquid, flows. This arrangement assures intimate contact between the $CO_2$-laden processed gas and the scrubbing liquid chemical. At the bottom of the tower, there is a liquid reservoir which is generally provided with a float valve to regulate the liquid flow from the reservoir to pump 13. In the top of this tower 10 there is a spray head 12 that uniformly distributes the liquid chemical over the top of the packing material to thoroughly wet the material and assure the necessary intimate contact with the rising processed gas. It was also not deemed necessary to illustrate any details of the packing rings, regulating float valve or spray head in order to give understanding of the operation of the absorption system. The concept is believed fully illustrative of the liquid chemical intimately contacting the processed gas in tower 10.

Conduit 7 brings the processed gas into tower 10 at a first temperature as a result of the controlled reduction in temperature in the heat exchanger 4 in order that it may pass upwardly through the packing rings and leave by conduit 11. Once its $CO_2$ constituent is removed in tower 10, the processed gas becomes the desired high nitrogen, CO₂-free atmosphere desired. This gas is then taken, by conduit 11, to cooling and drying equipment prior to ultimate use. Again it is not deemed necessary to illustrate these relatively elemental structures.

Prior to specific consideration of the structure embodying the present invention, attention is drawn to the cycle for the chemical compound, monoethanolamine. Consideration of this circuit may begin with spray head 12, in the top of tower 10. As discussed supra, the chemical descends, depicted as drops making a path down through the packing, to the reservoir in the bottom of the tower. Pump 13 is again referred to as taking the CO₂-saturated liquid to the top of a so-called stripper column 14.

Stripper column, or tower, 14, is essentially a heat-transfer structure associated with combustion chamber 1. As in tower 10, a spray head 15 trickles the CO₂-laden chemical over packing material in order to bring it into contact with steam rising from the bottom of the column. This steam is formed from part of the water mixed with the chemical and serves to drive the CO₂ out of the top of column 14 and into conduit 16.

The mixture of steam and CO₂ in conduit 16 is taken through a heat exchanger 17 where the water is condensed. Following the heat exchanger 17 is a separator 18 designed to release the CO₂ and return the condensed water to the bottom of column 14.

The liquid chemical, with its water content maintained constant, is then transported by pump 19 through a heat exchanging cooler 20. From exchanger 20 the liquid chemical solution is taken to spray head 12 to complete its circuit.

With the foregoing description of the overall operation of the atmosphere generator appreciated, attention is drawn to a problem which has long existed in connection with its operation. It has been observed that adequate control has been lacking for the processed gas as it enters absorbing tower 10 by conduit 7 and leaves tower 10 by conduit 11. at a second higher temperature. Lack of control at this point has resulted in undesirable exchange of moisture between processed gas and processing chemical. The situation may be more thoroughly appreciated when it is pointed out that the processed gas is saturated as it enters the bottom of tower 10 from conduit 7. The relative temperatures between the liquid chemical descending through tower 10 and the processed gas ascending through tower 10 is usually such as to raise the temperature of the processed gas. The first consideration is the removal of a portion of the processed gases by absorption into the chemical. Reduction of the volume of a saturated gas means that the moisture that had been held by the removed portion of the gas cannot be held by the remaining portion of the gas unless its temperature is sufficiently elevated. In prior practice, temperature elevation was often not sufficient to retain the moisture. The result is a liquid chemical weakened by the amount of moisture brought into it, along with the CO₂ absorbed.

The question could be raised as to the removal of moisture in stripper column 14. However, this moisture passing out of column 14 with the CO₂ in conduit 16, is returned to the liquid chemical at the bottom of column 14. Conceivably, a system could detect the amount of water removed by separator 18 and balance this amount against that absorbed in tower 10. However, this system would unnecessarily complicate the apparatus disclosed. The present invention is embodied in structure which simply prevents the exchange of moisture between processed gas and processing liquid within tower 10. The result is to maintain the liquid chemical at uniform strength.

Detection of temperature in conduit 7 and in conduit 11 will make possible continuous comparison of these temperatures in maintaining a predetermined differential which will compensate for CO₂ removal. The control impulses developed from these differential temperatures is applied to regulation of cooling water supplied to exchanger 4. The functional result is an adjustment of the temperature of processed gas in conduit 7 which will permit the temperature rise required in tower 10 for the processed gas to retain its total moisture as it ascends therethrough, and has its CO₂ absorbed.

Specific structure to carry out the invention includes temperature elements 30 and 31 which have been located in conduits 7 and 11. Elements 30 and 31 are selected as devices which vary their electrical characteristics in accordance with the temperature to which they are exposed. Using resistance thermometers as illustrative of such sensing devices, each element comprises one leg of the Wheatstone bridge circuit 32. The unbalance of bridge 32 is amplified by circuit 33 in order to control rotation of motor 34 which positions cam 36 in mechanical actuation of fluid pressure pilot valve 37. Therefore, a pneumatic pressure is developed in conduit 38 which is proportional to the difference in temperature desired between conduit 7 and 11.

The developed fluid pressure of conduit 38 is applied to the control of a valve through relay 39. Relay 39 may take the form of the structure disclosed in the application to Gorrie, Serial No. 311,098, filed September 23, 1952, now Patent 2,776,669. The output of relay 39 is placed in conduit 40 and applied to the control of valve 41, regulating the supply of cooling water in conduit 42, going to condenser 4.

It may now be fully appreciated that the control system responsive to the differences in temperature maintains a predetermined difference in temperature. A predetermined difference in temperature is matched to the temperature rise required for the processed gas to compensate for the CO₂ removal in retaining its moisture. Any variation of this balance is adjusted by regulation of the cooling medium for the processed gas until the temperature differential is adjusted to retain all moisture in the processed gas during its ascent through tower 10. The liquid chemical is, consequently, not diluted by quantities of water added to it in tower 10, and its effectiveness is maintained unimpaired through its cycle of application to the removal of CO₂ from the processed gas.

What I claim as new and desire to secure by Letters Patent of the United States is:

1. A system for the production of high nitrogen, carbon dioxide-free atmosphere for industrial processes and comprising means for burning a mixture of fuel and air to produce hot gaseous products of combustion containing water vapor, a gas cooler receiving such products of combustion, means supplying cooling fluid in indirect heat exchange relation to the gas cooler, a vapor separator receiving cooled gaseous products of combustion from the gas cooler and removing moisture therefrom, an absorption tower for contacting an absorbent liquid with vapors undergoing absorption and having means within its upper end supplying a carbon dioxide selective absorbent liquid to the packed portion thereof to remove the carbon dioxide from said products of combustion and to raise the temperature thereof, means conducting separated carbon dioxide saturated gas from the vapor separator to a lower portion of the absorption tower, means at the upper end of said tower for discharging gas of high nitrogen, carbon dioxide-free atmosphere composition, a stripper column indirectly heated at the bottom, conduit means passing carbon dioxide saturated absorbent liquid from the bottom of the absorption tower to the top of the stripping column, means for removing stripped carbon dioxide from the top of said column, conduit means passing absorbent liquid collected at the bottom of the stripper column to the said selective absorbent liquid supplying means of the absorption tower, means for detecting the temperature of said separated carbon dioxide saturated gas entering the absorption tower, means for detecting the temperature of the gas after being freed of carbon dioxide in the absorption tower, and means operatively connected to both said detecting means and responsive to the temperature differential detected by the two temperature detecting means for controlling the supply of cooling fluid to the gas cooler.

2. A system for the production of high nitrogen, carbon dioxide-free atmosphere for industrial processes and comprising means for burning a mixture of fuel and air to produce hot gaseous products of combustion containing water vapor, a gas cooler receiving such products of combustion, means supplying cooling water in indirect heat exchange relation to the gas cooler, a vapor separator receiving cooled gaseous products of combustion from the gas cooler and removing condensed moisture therefrom, an absorption tower of the packed type having spray means within its upper end applying a carbon dioxide selective absorbent liquid to the packed portion thereof to remove the carbon dioxide from said products of combustion and to raise the temperature thereof, means conducting separated carbon dioxide saturated gas from the vapor separator to a lower portion of the packed portion of the absorption tower, conduit means at the upper end of said tower for removing gas of high nitrogen, carbon dioxide-free atmosphere composition, a stripper column indirectly heated at the bottom by said hot products of combustion, conduit means passing carbon dioxide saturated absorbent liquid from the bottom of the absorption tower to the top of the stripping column, means for removing stripped carbon dioxide from the top of said column, conduit means passing absorbent liquid collected at the bottom of the stripper column to the spray means of the absorption tower, means for detecting the temperature of said separated carbon dioxide saturated gas before entering the absorption tower, means for detecting the temperature of the gas after being freed of carbon dioxide in the absorption tower, and means operatively connected to both said detecting means and responsive to the temperature differential detected by the two temperature detecting means for controlling the supply of cooling fluid to the gas cooler.

3. The system as defined in claim 2 and including an indirect condenser and a carbon dioxide separator connected in series between the top of the stripper column and the bottom thereof for separating carbon dioxide from the system and returning water thereto.

4. In a system for the production of high nitrogen, carbon dioxide-free atmosphere, the combination comprising means for burning a mixture of fuel and air to produce gaseous products of combustion containing water and carbon dioxide, cooling means for said gaseous products comprising a cooling fluid in indirect contact therewith for cooling the same to a first temperature, means for contacting said products with an absorbing medium following cooling thereof to remove the carbon dioxide from said products and to raise the temperature thereof to a second temperature, means for controlling the supply of cooling fluid to said cooling means to control the cooling effect thereof and said first temperature, a pair of temperature sensitive elements positioned to measure said first and second temperatures, means associated with said temperature sensitive elements for comparing said first and second temperatures to produce a signal representative of their difference, and means responsive to a change in said signal for actuating said controlling means to vary the supply of cooling fluid to said cooling means.

5. In a system for the production of high nitrogen, carbon dioxide-free atmosphere, the combination comprising means for burning a mixture of fuel and air to produce gaseous products of combustion containing water and carbon dioxide, cooling means utilizing a flow of cooling fluid in indirect contact with said products for cooling the same to a first temperature, means for contacting said products with an absorbing medium following cooling thereof to remove the carbon dioxide from said products and to raise the temperature thereof to a second temperature, means for controlling the supply of cooling fluid to the cooling means to control the cooling effect thereof and said first temperature, a pair of temperature sensitive resistance elements responsive to said first and second temperatures respectively, an electric bridge circuit having said resistance elements connected as arms thereof to effect unbalance of said bridge circuit in response to a change in the temperature difference between said first and second temperatures, and means responsive to unbalance of said bridge for actuating said control means to effect a change in the supply of cooling fluid to said cooling means and a change in said first temperature.

References Cited in the file of this patent
UNITED STATES PATENTS

| | | |
|---|---|---|
| 2,085,584 | Haskell | June 29, 1937 |
| 2,272,261 | Bergman | Feb. 10, 1942 |
| 2,314,827 | Hortvet | Mar. 23, 1943 |
| 2,389,448 | Mekler | Nov. 20, 1945 |